UNITED STATES PATENT OFFICE.

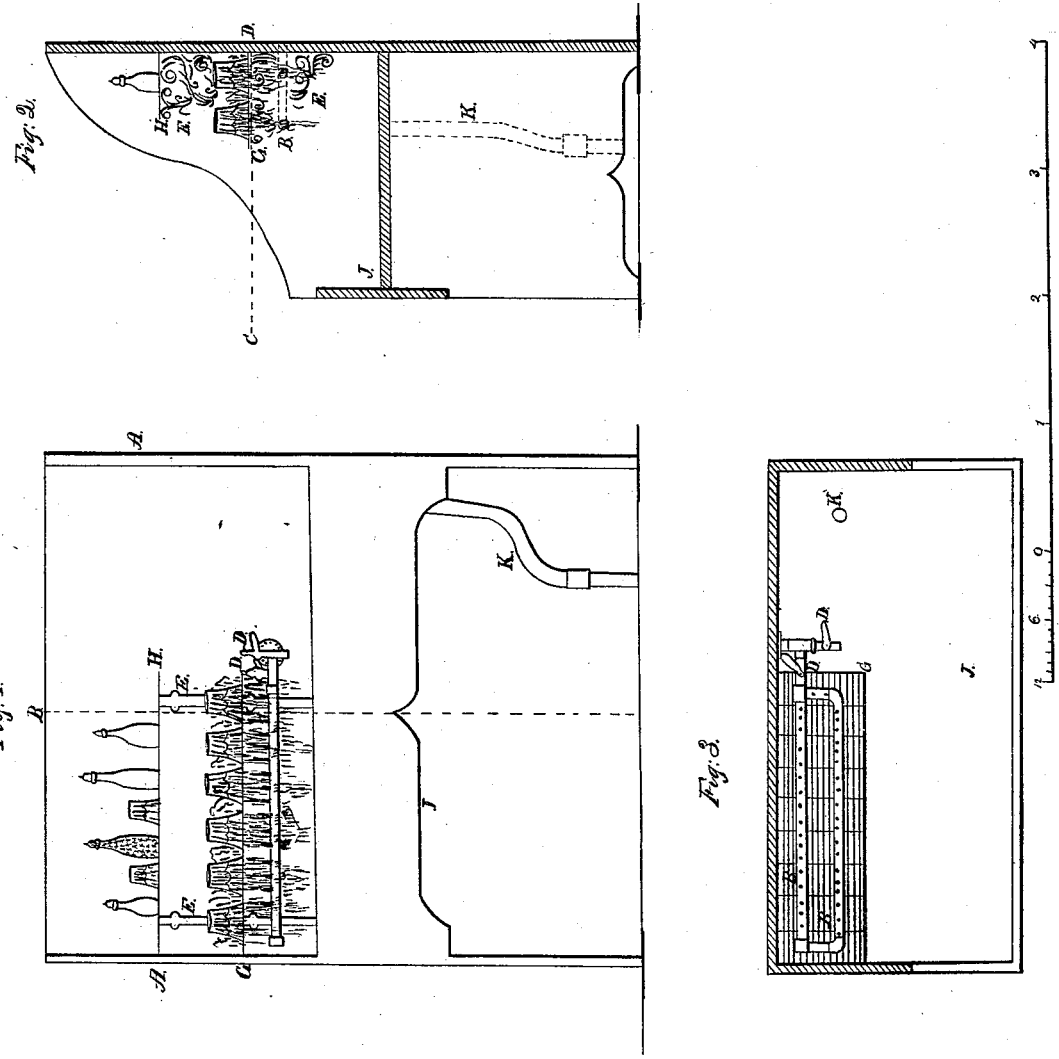

BARNEY HART, OF WASHINGTON, DISTRICT OF COLUMBIA.

APPARATUS FOR WASHING TUMBLERS.

Specification forming part of Letters Patent No. 48,934, dated July 25, 1865.

*To all whom it may concern:*

Be it known that I, BARNEY HART, of the city of Washington, District of Columbia, have invented a new and useful Apparatus for Washing Tumblers; and I do hereby declare the following to be an exact description thereof, reference being had to the accompanying drawings, and to the letters of reference marked thereon, making a part of this specification.

The nature of my invention consists in the arrangement and combination of perforated pipes supported by brackets, with stop-cocks at the side, and a grate attached to an ornamental frame with a water-trough to catch and carry off the water after the tumblers have been washed by jets of water thrown up into and around the tumblers, the whole intended to be placed at or near the bar of a drinking-saloon, or any public room or office.

Figure 1 represents a front elevation; Fig. 2, a side or sectional view; Fig. 3, a top view or horizontal section.

A represents the ornamental frame that supports the apparatus or devices. Two perforated pipes, B B, connected at their ends, and at one end connected with the ordinary hydrant-pipe, C, extend through the back of frame A, with stop-cocks or spigots D D, for regulating the flow of water. These pipes are supported by brackets E E, that are permanently fastened to the frame A. The brackets also support a neat grate, G, placed about four or five inches above the perforated pipes, upon which the tumblers are placed bottoms up. A shelf, H, rests upon the top of the brackets, for the purpose of standing tumblers or bottles upon, to be likewise kept clean and cool and free from flies by the spray from the jets of water. The water being let on in a proper flow, it is forced through the apertures of the pipes B upward in jets into the tumblers, and between and above them, thus completely cleansing and washing them, always ready for use, the water falling into the trough J beneath, and discharged through a lower pipe, K.

What I claim as my invention, and desire to secure by Letters Patent, is—

The arrangement and combination of the apparatus with the water-pipes and grating above, by which a continual jet of water is projected into each tumbler or glass, so as to cleanse and rinse the glass completely, as herein described.

B. HART.

Witnesses:
 SAML. DRURY,
 GEORGE POORE.